(12) United States Patent
Reinauer et al.

(10) Patent No.: US 10,003,114 B2
(45) Date of Patent: Jun. 19, 2018

(54) CATHODE FOR A METAL/AIR BATTERY AND METHODS FOR MANUFACTURING SUCH A CATHODE

(71) Applicant: The Swatch Group Research and Development Ltd, Marin (CH)

(72) Inventors: Olga Reinauer, Neuchatel (CH); Michael Stalder, Bellmund (CH); Fredy Zullig, Delemont (CH)

(73) Assignee: The Swatch Group Research and Development Ltd, Marin (CH)

( * ) Notice: Subject to any disclaimer, the term of this patent is extended or adjusted under 35 U.S.C. 154(b) by 19 days.

(21) Appl. No.: 15/374,510

(22) Filed: Dec. 9, 2016

(65) Prior Publication Data

US 2017/0179556 A1    Jun. 22, 2017

(30) Foreign Application Priority Data

Dec. 21, 2015    (EP) ..................................... 15201689

(51) Int. Cl.

| | |
|---|---|
| *H01M 12/08* | (2006.01) |
| *H01M 4/86* | (2006.01) |
| *H01M 4/88* | (2006.01) |
| *H01M 12/06* | (2006.01) |

(52) U.S. Cl.
CPC ......... *H01M 12/08* (2013.01); *H01M 4/8605* (2013.01); *H01M 4/8642* (2013.01); *H01M 4/8668* (2013.01); *H01M 4/8825* (2013.01); *H01M 12/065* (2013.01); *H01M 4/8828* (2013.01); *H01M 4/8882* (2013.01); *H01M 4/8896* (2013.01); *H01M 2004/8689* (2013.01)

(58) Field of Classification Search
CPC ........................... H01M 12/08; H01M 4/8605
See application file for complete search history.

(56) References Cited

U.S. PATENT DOCUMENTS

| | | |
|---|---|---|
| 2014/0120429 A1 | 5/2014 | Kirchev |
| 2014/0308594 A1 | 10/2014 | Dudney et al. |

FOREIGN PATENT DOCUMENTS

| | | |
|---|---|---|
| FR | 2 785 093 | 4/2000 |
| FR | 2 977 081 | 12/2012 |

OTHER PUBLICATIONS

European Search Report dated Feb. 25, 2016 in European application 15201689.5, filed on Dec. 21, 2015 (with English Translation of Categories of Cited Documents).

(Continued)

*Primary Examiner* — Olatunji Godo
(74) *Attorney, Agent, or Firm* — Oblon, McClelland, Maier & Neustadt, L.L.P.

(57) ABSTRACT

The invention relates to a cathode for a metal/air battery comprising at least one active layer produced in an active material and having an air side and a metal side, a current collector and a hydrophobic membrane produced in a hydrophobic material and deposited on the air side of the active layer. Said hydrophobic material has a porous structure and has penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode.

16 Claims, 2 Drawing Sheets

(56) References Cited

OTHER PUBLICATIONS

Junqing Pan et al. "Preliminary study of alkaline single flowing Zn-$O_2$ battery", Electrochemistry Communications, vol. 11, Nov. 2009, pp. 4.
W.L Gore et al. "Maximizing Performance in the Harshest Environments", ePTFE Fiber Solutions, gore.com/fiberstanarafabric.com, 2009, pp. 2.

CATHODE FOR A METAL/AIR BATTERY AND METHODS FOR MANUFACTURING SUCH A CATHODE

This application claims priority from European Patent application 15201689.5 of Dec. 21, 2015, the entire disclosure of which is hereby incorporated herein by reference.

FIELD OF THE INVENTION

The invention relates to a cathode for a metal/air battery comprising at least one active layer produced in an active material and having an air side and a metal side, a current collector and a membrane produced in a hydrophobic material and deposited on the air side of the active layer. The present invention likewise relates to methods for manufacturing such a cathode, and also a metal/air battery comprising such a cathode.

BACKGROUND OF THE INVENTION

A cathode for a metal/air battery is generally used in a button battery. It has the shape of a disc situated under aeration holes provided in the casing. An air diffuser paper is generally positioned between the casing and the cathode. In contrast to other types of batteries, the cathode in a metal/air battery should store only the quantity of electroactive material (typically oxygen) which is necessary for the immediate requirements of the battery, the rest being replaced bit by bit from the exterior, through the aeration holes. For this reason, the cathode can be produced from a very thin strip, allowing the majority of the volume of the battery available for the anode (for example zinc in the case of a zinc/air battery).

The cathode of the metal/air battery is formed from at least one current collector (for example nickel mesh), which guides the electrons from the casing of the battery towards the catalyst, the air and the electrolyte, and also a catalyst which assists the transfer of electrons towards the oxygen which is reduced to form hydroxide, thus creating an electric current. Such a catalyst is for example an oxide of manganese.

The difficulty in producing the cathode of a metal/air battery originates from the fact that the catalyst must be in contact simultaneously with the current collector (solid), the air (gaseous) and the electrolyte (liquid). It is particularly complicated to succeed in making these three phases coexist on the greatest possible surface. In order to resolve this problem, one solution for increasing the interface between air, electrolyte and catalyst and therefore improving the power of the battery, consists in conferring a certain hydrophobicity to the cathode. The addition of hydrophobic additives in the composition of the cathode makes it possible to avoid the whole of the cathode being flooded by the electrolyte and thus leaving space for the air to penetrate better into the cathode. To this end, typically a hydrophobic binder is used, such as polytetrafluoroethylene (PTFE), in the form of powder or an aqueous dispersion. The addition of such a hydrophobic binder makes it possible to increase the power of the cathode as a function of the concentration of PTFE but only to an optimum concentration (typically 15-20%) beyond which the power of the battery decreases. This loss of power is due to the homogeneous dispersion of the PTFE in the entirety of the cathode which has the effect of reducing the electrical conductivity (interruption by PTFE of percolation of the network formed by the carbon particles) and of reducing likewise the quantity of electrolyte in the cathode.

Another solution for increasing the interface between air, electrolyte and catalyst consists of using a cathode which has a porous structure which makes it possible for the electrolyte and the air to penetrate better into the cathode. Typically, such a porous structure is obtained by using a mixture of various conductive particles, such as particles of conductive carbons (carbon black, graphite etc. . . . ).

Such a cathode is described for example in the patent application US 2014/0308594. According to this document, the cathode comprises an active layer which has a porous structure, the porosity of which decreases between the air side and the metal side of the cathode. Various manufacturing methods are described which make it possible to obtain an active layer which has a porosity gradient in the thickness of the active layer instead of a uniform porous structure. This porosity gradient is due to a variation in the intrinsic porosity of the material of the active layer of the cathode which is controlled during manufacture thereof.

The patent FR 2785093 likewise describes a cathode, the active layer of which has pores and comprises graphite particles, the average size of which is greater than the average diameter of the pores of the active layer. The cathode comprises furthermore a diffusion layer which is a hydrophobic membrane deposited on the air side of the active layer. This hydrophobic membrane is of the Gore-Tex® type which is made of expanded polytetrafluoroethylene (ePTFE). The cathode is obtained by preparing the active layer in the form of a paste, then the paste is spread over one face of the current collector. The membrane of the Gore-Tex® type is applied on the other face. Then the cathode is dried and compressed. In this cathode, the hydrophobic membrane, because of its structure, remains of a constant thickness, and the only role thereof is to make the surface of the cathode more hydrophobic in order to increase its resistance to flooding.

Metal/air batteries, essentially zinc/air, are currently used in auditory appliances because of their highest energy density among commercial batteries. For this application, the metal/air batteries must be replaced every week and are not therefore optimised with respect to their lifespan but are as it is optimised with respect to their power. However for applications such as connected watches, which involve very high current peaks for the primary batteries, it is necessary to have available batteries which have greater power. The power of metal/air batteries being limited by their cathode, it is necessary to develop cathodes which make it possible to obtain an increase in power of the battery which decreases only slightly in the course of time, in order thus to become useful in a clockmaking application.

SUMMARY OF THE INVENTION

To this end, the present invention relates to a cathode for a metal/air battery comprising at least one active layer produced in an active material and having an air side and a metal side, a current collector and a hydrophobic membrane produced in a hydrophobic material and deposited on the air side of the active layer.

According to the invention, said hydrophobic material has a porous structure and has penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode.

The present invention likewise relates to various methods for manufacturing a cathode for a metal/air battery as defined above.

The present invention likewise relates to a metal/air battery comprising at least one anode based on said metal, a cathode as defined above and an electrolyte.

The interpenetration zone of hydrophobic material into the active material in which there is a concentration gradient of hydrophobic material which decreases in the ingoing direction of air into the cathode makes it possible to increase locally the quantity of hydrophobic material and therefore the hydrophobicity of the air side of the active layer, then to reduce the quantity of hydrophobic material and thus the hydrophobicity, when moving away from the air side of the active layer. The local increase in hydrophobicity of the air side of the active layer has the effect of increasing the volume of air in contact both with the electrolyte and the catalyst. Hence the contact surface between the three phases, solid/liquid/gaseous, is increased. Then the decrease in hydrophobicity, when moving away from the air side of the active layer, causes a decrease in the quantity of air in favour of an increase in the electrolyte quantity. This configuration is optimal for the cathode since the quantity of anions which will be transportable by the electrolyte between the cathode and the anode, and upon which the power of the battery depends, increases with the thickness.

BRIEF DESCRIPTION OF THE DRAWINGS

Other features and advantages of the invention will appear more clearly upon reading the following description of an embodiment of the invention, given merely by way of illustrative example and non-limiting, and the annexed Figures, in which.

DETAILED DESCRIPTION OF A PREFERRED EMBODIMENT

Figure 1:
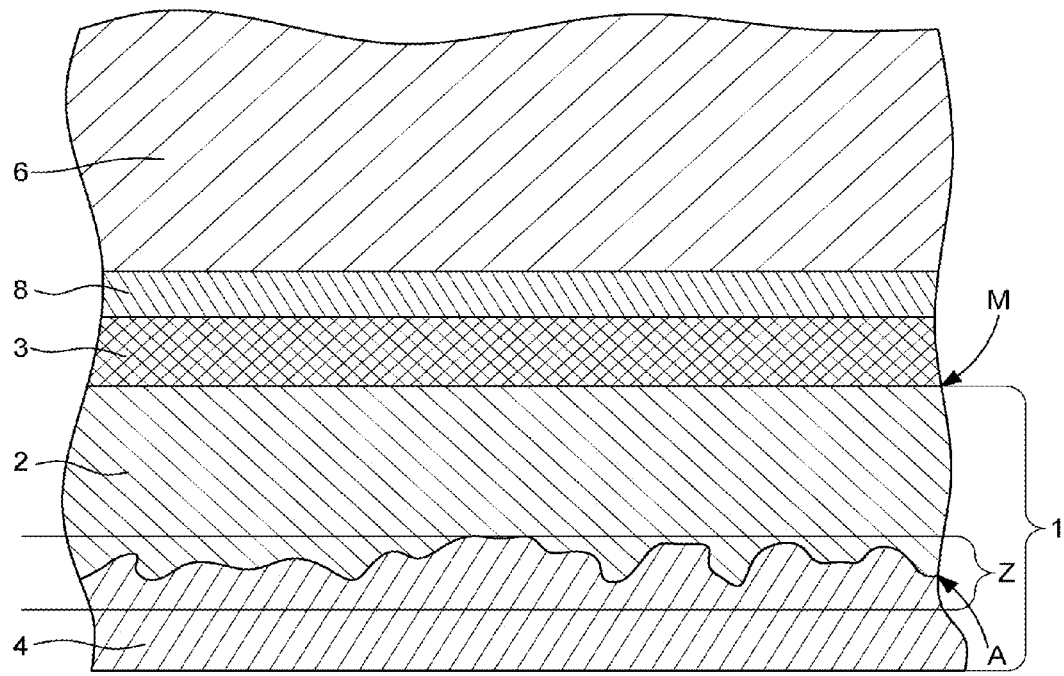
FIG. 1 is a partial sectional view of a battery according to the invention.
Figure 2:
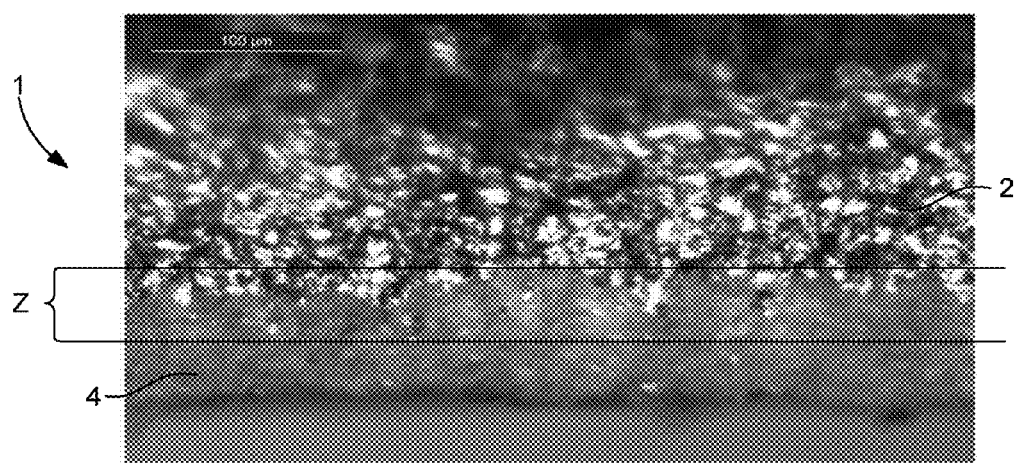
FIG. 2 is a stereomicroscopic image of a section of a cathode according to the invention.

With reference to FIGS. 1 and 2, the present invention relates to a cathode 1 for a metal/air battery, comprising at least one active layer 2 produced in an active material and having an air side A and a metal side M. The active layer 2 of the cathode of the invention is entirely standard and known to the person skilled in the art such that a detailed description of such an active layer is unnecessary. It will merely be specified that the active layer preferably has a porous structure. Furthermore, the active material of the active layer comprises, in a known manner, at least one binder, one catalyst and conductive particles which make it possible to obtain a porous structure. The binder is preferably a hydrophobic binder, such as polytetrafluorethylene (PTFE) or any other appropriate hydrophobic binder. The catalyst can be chosen from precious metals and metallic oxides. Preferably, the catalyst is an oxide of manganese $Mn_2O_3$ or any other appropriate catalyst. The conductive particles are preferably a mixture of various conductive carbons, such as particles of carbon black or graphite. The active layer 2 can be deposited in several layers.

The cathode likewise comprises, in a known manner, a current collector 3, which is for example a grille, a mesh, a mousse or a conductive felt, such as a nickel grille or mousse.

The cathode likewise comprises a hydrophobic membrane 4 produced in a hydrophobic material and deposited on the air side of the active layer.

In accordance with the present invention, said hydrophobic material has a porous structure and has penetrated into the air side A of the active layer 2 so as to form, between the hydrophobic membrane 4 and the air side A of the active layer 2, an interpenetration zone Z of hydrophobic material in the active material in which there is a concentration gradient of hydrophobic material which decreases in the ingoing direction of air into the cathode (i.e. the air side A towards the metal side M).

Hence, the concentration of hydrophobic material in the interpenetration zone Z changes from 100% to 0% in the ingoing direction of air into the cathode, the interpenetration zone Z extending over a thickness between 10 and 25% of the total thickness of the active layer.

Advantageously, the porous structure of the hydrophobic material of the hydrophobic membrane 4 has the form of a matrix of very thin fibrils interconnecting solid nodes, the space between the nodes and the fibrils forming microscopic pores of an average size between 30 μm and 100 μm, and preferably between 50 μm and 80 μm.

Preferably, the hydrophobic membrane 4 has a density between 0.2 $g/cm^3$ and 0.5 $g/cm^3$.

In a particularly preferred manner, the hydrophobic material is a fluorinated polymer which is extruded then expanded. More particularly, the hydrophobic material of the hydrophobic membrane 4 is made of polytetrafluoroethylene (PTFE) which is extruded then expanded. The hydrophobic membrane 4 is for example an Aeos® membrane marketed by Zeus Inc. The thickness of the hydrophobic membrane before use thereof is between 0.2 mm and 5 mm, preferably between 0.5 and 5 mm, and more preferably between 0.5 mm and 2 mm.

The present invention likewise relates to a first variant of a method for manufacturing a cathode for the metal/air battery as described above, comprising the steps of:
a) preparing the active material of the active layer in the form of a paste, by mixing for example various components of the active material in a liquid
b) depositing the paste obtained in step a) on the current collector
c) depositing the hydrophobic membrane produced in a hydrophobic material which has a porous structure, as defined above, on the paste as obtained in step b)
d) applying a pressure over the assembly obtained in step c), the applied pressure being preferably less than or equal to a pressure corresponding to a linear load of 150 N/mm, i.e. 3 MPa, so as to form, between the hydrophobic membrane and the active layer, an interpenetration zone Z of hydrophobic material in the active material, in which there is a concentration gradient of hydrophobic material which decreases in the ingoing direction of air into the cathode.

The present invention likewise relates to a second variant of a method for manufacturing a cathode for the metal/air battery as described above, comprising the steps of:
a') preparing the active material of the active layer in the form of a paste, by mixing for example various components of the active material in a liquid
b') depositing a first layer of the paste obtained in step a') on the current collector c') applying a pressure over the assembly obtained in step b'), the applied pressure being preferably greater than or equal to a pressure corresponding to a linear load of 250 N/mm, i.e. at least 5 MPa, and more preferably between 250 N/mm and 500 N/mm d') depositing a second layer of paste on the assembly obtained in step c')

e') depositing the hydrophobic membrane produced in a hydrophobic material which has a porous structure, as defined above, on the second layer of paste as obtained in step d')

f') applying a pressure over the assembly obtained in step e'), the applied pressure being preferably less than or equal to a pressure corresponding to a linear load of 150 N/mm, i.e. 3 MPa, so as to form, between the hydrophobic membrane and the active layer, an interpenetration zone Z of hydrophobic material in the active material, in which there is a concentration gradient of hydrophobic material which decreases in the ingoing direction of air into the cathode.

The use of the active layer in the form of a paste makes is possible to deform said active layer more easily under pressure than a cathode pressed when dry.

Preferably, application of a pressure in steps d), c') and f') is produced by a rolling process, the rolling steps advantageously being able to be produced by means of a roller mill.

Preferably, the methods according to the invention comprise respectively a step of drying the cathode obtained after step d) or f'). The drying is preferably achieved under vacuum. After drying, the cathode can be rolled once again with a pressure less than or equal to a pressure corresponding to a linear load of 150 N/mm, i.e. 3 MPa.

Figure 3:
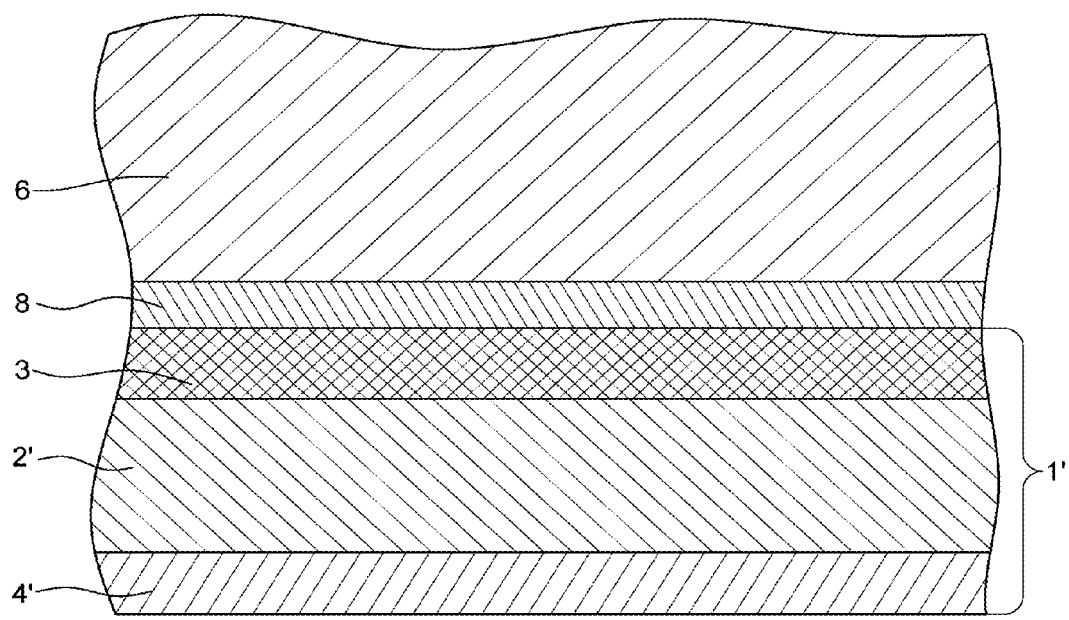
FIG. 3 is a partial sectional view of a battery according to the prior art.

In the cathode of the invention, as a result of using an active layer in the form of a paste and a hydrophobic membrane which has a specific morphology comprising large fibrillar pores, on the one hand, and the use of a method making it possible to apply a pressure on the hydrophobic membrane in order to assemble said hydrophobic membrane over the active layer, on the other hand, the hydrophobic material of the hydrophobic membrane 4 has penetrated into the active layer 2 of the cathode, as FIGS. 1 and 2 show, in order to create the interpenetration zone Z and the concentration gradient of the hydrophobic material. In the cathodes 1' of the batteries of the prior art, as represented in FIG. 3, the hydrophobic membrane 4' deposited on the active layer 2' remains on the surface thereof (the references of the other elements of the battery remaining identical moreover), so that the dispersion of the PTFE, as binder, remains homogeneous.

Once rolled onto the cathode 1, the hydrophobic membrane 4 is greatly compressed so that it adds no more than 0.1 mm thickness, like a hydrophobic membrane which is used as standard. Hence, there is no risk of increasing the thickness of the cathode and of decreasing the energy which can be stored in the battery. Furthermore, the porosity of the hydrophobic membrane once rolled is decreased by a factor of 10 or more, such that the ageing by drying/flooding remains similar to that of a standard battery.

The present invention likewise relates to a metal/air battery comprising at least one anode 6 based on said metal, a cathode as described above and an electrolyte.

The anode can be based on a metal, such as Li, Na, Mg and Zn. Preferably, the anode is produced based on zinc powder.

The electrolyte is for example a solution of KOH.

The battery likewise comprises a separator 8 placed between the cathode and the anode. A separator made of cellulose is used for example. The electrolyte wets the separator, the anode and the cathode.

The metal/air battery preferably has the form of a button battery and is assembled by placing the cathode, hydrophobic membrane side, against the opening in the casing. An air diffuser can be placed between the cathode and the cover of the battery. The battery likewise has a sealing joint.

The battery obtained according to the invention does not have disadvantages compared to a known battery. On the contrary, it has the advantage of having a power which is improved by approx. 10% compared to standard batteries. In fact, use of a hydrophobic membrane which has a specific morphology comprising large fibrillar pores in order to create the interpenetration zone Z and the concentration gradient of the hydrophobic material makes it possible to create a three-dimensional hydrophobic matrix with a variable morphology and thus to increase the gas/liquid/solid contact surface in the active layer of the cathode.

The following examples illustrate the present invention without however limiting the scope thereof.

A paste corresponding to the active material of the cathode is produced by mixing 25% by weight of $Mn_2O_3$, 51% of graphite, 15% of carbon black and 9% of PTFE dispersed in water. Ethanol is added in order to obtain a dispersion with 15% by mass of the solid material. This is mixed with a magnetic agitator. The obtained mixture is poured into the grinding receptacle of a planetary grinder with $SiO_2$ agate marbles of a diameter between 5 and 20 mm. The mixture is ground in the planetary grinder with a speed of rotation and a grinding time adapted to the type of grinder and the grinding conditions. The grinding can also be achieved in several steps by varying the size of the marbles and the speeds of rotation. The ground dispersion is filtered under vacuum, then the solid material is recovered. The solid material is in the form of a paste which can be kneaded if necessary.

Rolling in One Step

The paste is placed on a nickel grille. The hydrophobic membrane is placed on the paste. The assembly is rolled with a roller mill with a pressure corresponding to a linear load which does not exceed 150 N/mm, i.e. 3 MPa.

Rolling in Two Steps

The paste is placed on a nickel grille. The paste is rolled with a roller mill with a pressure corresponding to a linear load of at least 250 N/mm, i.e. at least 5 MPa. The maximum value of the pressure which could be applied corresponds to a linear load of 375 N/mm, i.e. 7.5 MPa. A second layer of paste is placed over the rolled part. The hydrophobic membrane is placed above. The assembly is rolled with a roller mill with a pressure corresponding to a linear load which does not exceed 150 N/mm, i.e. 3 MPa.

The prepared cathode is dried under vacuum at 90° C. for 16 hours. After drying, the cathode can be rolled once again with a pressure corresponding to a linear load which does not exceed 150 N/mm.

A Zn-air battery of the "button" type is assembled with the prepared cathode. The anode is made of zinc powder, the electrolyte is a solution of 9M KOH, the separator is made of cellulose.

By way of comparative example, a similar battery is produced, but using a standard cathode manufactured by compression of the powders.

The diameter of the cathode is 19 mm.

Results

Zn-air batteries with a cathode made of paste and the hydrophobic membrane according to the invention and rolled in a step according to a method of the invention have a power of 68 mW, whilst the battery containing a standard cathode and the hydrophobic membrane has a power of 60 mW, i.e. an increase in power of more than 13%.

What is claimed is:

1. A cathode for a metal/air battery comprising at least one active layer which is produced in an active material and has an air side and a metal side, a current collector, and a hydrophobic membrane produced in a hydrophobic material and deposited on the air side of the active layer, wherein said hydrophobic material has a porous structure and wherein said hydrophobic material has penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode.

2. The cathode according to claim 1, wherein the porous structure of the hydrophobic material has the form of a matrix of fibrils interconnecting solid nodes, the space between the nodes and the fibrils forming microscopic pores.

3. The cathode according to claim 1, wherein the hydrophobic membrane has a density between 0.2 g/cm$^3$ and 0.5 g/cm$^3$.

4. The cathode according to claim 2, wherein the microscopic pores have an average size between 30 and 100 µm.

5. The cathode according to claim 3, wherein the microscopic pores have an average size between 30 and 100 µm.

6. The cathode according to claim 1, wherein the hydrophobic material is a fluorinated polymer which is extruded then expanded.

7. The cathode according to claim 1, wherein the concentration of hydrophobic material in the interpenetration zone changes from 100% to 0% in the ingoing direction of air into the cathode, the interpenetration zone extending over a thickness between 10 and 25% of the total thickness of the active layer.

8. The cathode according to claim 1, wherein the active material comprises at least one binder, one catalyst and conductive particles.

9. A method for manufacturing a cathode for the metal/air battery comprising at least one active layer which is produced in an active material and has an air side and a metal side, a current collector, and a hydrophobic membrane produced in a hydrophobic material and deposited on the air side of the active layer, said hydrophobic material having a porous structure and said hydrophobic material having penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode, said method comprising the steps of:
  a) preparing the active material of the active layer in the form of a paste,
  b) depositing the paste obtained in step a) on the current collector
  c) depositing a hydrophobic membrane produced in a hydrophobic material which has a porous structure on the paste as obtained in step b)
  d) applying a pressure over the assembly obtained in step c), so as to form, between the hydrophobic membrane and the active layer, an interpenetration zone of hydrophobic material in the active material, in which there is a concentration gradient of hydrophobic material which decreases in the ingoing direction of air into the cathode.

10. The method according to claim 9, wherein the pressure applied in step d) is less than or equal to a pressure corresponding to a linear load of 150 N/mm.

11. A method for manufacturing a cathode for the metal/air battery comprising at least one active layer which is produced in an active material and has an air side and a metal side, a current collector, and a hydrophobic membrane produced in a hydrophobic material and deposited on the air side of the active layer, said hydrophobic material having a porous structure and said hydrophobic material having penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode, said method comprising the steps of:
  a') preparing the active material of the active layer in the form of a paste
  b') depositing a first layer of the paste obtained in step a') over the current collector
  c') applying a pressure over the assembly obtained in step b')
  d') depositing a second layer of paste on the assembly obtained in step c')
  e') depositing a hydrophobic membrane produced in a hydrophobic material which has a porous structure on the second layer of paste as obtained in step d')
  f') applying a pressure over the assembly obtained in step e'), so as to form, between the hydrophobic membrane and the active layer, an interpenetration zone of hydrophobic material in the active material, in which there is a concentration gradient of hydrophobic material which decreases in the ingoing direction of air into the cathode.

12. The method according to claim 11, wherein the pressure applied in step c') corresponds to a linear load between 250 N/mm and 500 N/mm.

13. The method according to claim 11, wherein the pressure applied in step f') is less than or equal to a pressure corresponding to a linear load of 150 N/mm.

14. A manufacturing method according to claim 9, wherein it comprises a step of drying the cathode.

15. A manufacturing method according to claim 11, wherein it comprises a step of drying the cathode.

16. A metal/air battery comprising at least one anode based on said metal, a cathode comprising at least one active layer which is produced in an active material and has an air side and a metal side, a current collector, and a hydrophobic membrane produced in a hydrophobic material and deposited on the air side of the active layer, said hydrophobic material having a porous structure and said hydrophobic material having penetrated into the air side of the active layer so as to form, between the hydrophobic membrane and the active layer, an interpenetration zone of hydrophobic material in the active material, in which there is a concentration gradient of hydrophobic material which decreases in the ingoing direction of air into the cathode, and an electrolyte.

* * * * *